United States Patent [19]

McChesney et al.

[11] 3,949,038

[45] Apr. 6, 1976

[54] BLOWN THERMOPLASTIC BOTTLE AND METHOD FOR MAKING SAME

[75] Inventors: Charles Edmund McChesney, Monmouth Junction; Robert J. McHenry, Belle Mead; James Alan Wachtel, Princeton, all of N.J.

[73] Assignee: American Can Company, Greenwich, Conn.

[22] Filed: Aug. 1, 1973

[21] Appl. No.: 384,707

Related U.S. Application Data

[62] Division of Ser. No. 248,495, April 28, 1972.

[52] U.S. Cl. .................. 264/89; 264/94; 264/97; 264/99; 260/879
[51] Int. Cl.² .................. B29C 17/07; B29C 23/00; B29D 23/03; C08L 9/02
[58] Field of Search ............. 264/98, 97, 94, 89, 99; 260/879, 82.3

[56] References Cited
UNITED STATES PATENTS

| | | | |
|---|---|---|---|
| 3,426,102 | 2/1969 | Solak | 260/879 |
| 3,470,282 | 9/1969 | Scalora | 264/97 |
| 3,737,494 | 6/1973 | Wolf | 264/94 |
| 3,882,213 | 5/1975 | Uhlig | 264/97 |

OTHER PUBLICATIONS

"Thermoforming with Barex 210", SPE Journal, Vol. 28, pp. 35–38, Blower et al.

*Primary Examiner*—Harry Wong, Jr.
*Assistant Examiner*—Maria S. Tungol
*Attorney, Agent, or Firm*—Robert P. Auber; James W. Bock; George P. Ziehmer

[57] ABSTRACT

A thermoplastic bottle having a unique combination of properties. The bottle is characterized by a very high level of molecular orientation, and possesses the properties of high impact strength, low gas permeability and excellent resistance to creep strain under tensile load. A blowing process for fabricating the bottle is also taught which features a means for substantially improving the resistance to creep strain.

6 Claims, 4 Drawing Figures

BLOWN THERMOPLASTIC BOTTLE AND METHOD FOR MAKING SAME

This is a divisional of application Ser. No. 248,495, filed 4/28/72.

BACKGROUND OF THE INVENTION

This invention relates to thermoplastic bottles and more particularly to thermoplastic beer and carbonated beverage bottles having a unique combination of physical properties.

There are polymeric materials available today which have high impact strength and low gas permeability, but none of these possesses the property of excellent resistance to creep strain under tensile load, which is so necessary to the manufacture of commercially acceptable plastic bottles for beer and carbonated beverage. Creep strain is undesirable for two reasons: it results in a change of bottle shape whereby the liquid level is lowered, and it results in a loss of carbonation of the liquid owing to the expanded volume of the bottle.

The instant invention therefore provides a thermoplastic bottle having the following unique combination of physical properties: high impact strength, excellent resistance to creep strain under tensile load, and extremely low gas permeability. Existing thermoplastic bottles possess one or two of these properties, but the combination of all three in the required degree is unknown in the prior art.

This unique combination of physical properties is desired for the packaging of fluids under a high internal pressure, i.e., beer, carbonated beverages, and aerosol container products. A high level of molecular orientation, as characterized by orientation release stress (ASTM D 1504), is utilized to obtain the physical properties specified above.

It is known that the physical properties of thermoplastic polymers can be improved by uncoiling and straightening the molecules of the polymeric material by a stretching operation while the polymeric material is at a temperature at which such molecular orientation can be imparted thereto (orientation temperature), i.e., while the polymeric material is in the so-called "leathery" state, and thereafter cooling the material so that the molecules of the polymer are set in the direction or directions in which the stretch is applied.

SUMMARY OF THE INVENTION

It has not been known until the present invention that very high levels of orientation can result in surprisingly dramatic improvements in the creep strain resistance of thermoplastic, polymeric materials. Accordingly, the instant invention provides a method of substantially improving resistance to creep strain in thermoplastic polymers which comprises molecularly orienting the polymer to an orientation release stress between 350 and 2500 p.s.i.

The instant invention also provides a bottle weighing 0.03 to 0.13 grams per cubic centimeter of internal volume blown from a thermoplastic polymer having an oxygen permeability between 0.3 and 6.0 cubic centimeters per 100 square inches per mil thickness $(cm.^3\text{-}mil)/100 \text{ in.}^2)$ and a carbon dioxide permeability between 0.5 and 10.0 $cm.^3$ per 100 square inches per mil thickness, per 24 hours at a differential pressure of one atmosphere at 73°F. and 0 % relative humidity, said bottle having a sidewall creep strain in the circumferential direction of 0 to 3.0 % under a wall stress in the circumferential direction of 3000 p.s.i. at 100 hours at 98°F. at 50 % relative humidity, said bottle, when enclosed and filled with water carbonated with 3.7 volumes of carbon dioxide per one volume of water, able to withstand a free fall of at least 3 feet when dropped on its bottom onto a steel surface.

DESCRIPTION OF THE PREFERRED EMBODIMENT

Figure 1:
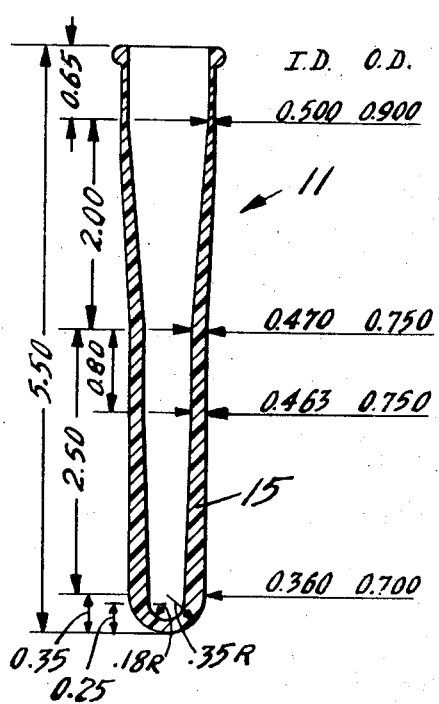
FIG. 1 is a central vertical sectional view of a parison used to form the bottle of the instant invention.

The instant invention is best practiced according to the parameters set forth hereinbelow. In forming a parison 11 (FIG. 1) from which a bottle 13 having a sidewall 15 (FIG. 2) is blown, it is necessary to select a thermoplastic polymer having low permeability to gases, so that the bottle 13 may act as a barrier to gases. The barrier properties of a polymer are determined in large part by the characteristics of the monomers from which said polymers are made. Monomers having high dipole moments are particularly suited for making barrier resins because their high dipole moments result in strong intermolecular forces between the polymer chains, reducing the diffusion and permeation rates of gases through the polymer. Since permeability is reduced as the concentration of highly polar monomer is increased, at least 50% by weight of the final polymer should result from inclusion of highly polar monomers in the polymerization reaction.

The polymers suited for use in the instant invention should have an oxygen permeability between 0.5 and 3.0 $cm.^3$ per 100 square inches per mil thickness and a carbon dioxide permeability between 0.8 and 5.0 $cm.^3$ per 100 square inches per mil thickness when tested for 24 hours at a differential pressure of 1 atmosphere at 73°F. and 0 percent relative humidity. Preferably, the oxygen permeability is between 0.6 and 0.8 $cm.^3$ per 100 square inches per mil thickness and the carbon dioxide permeability is between 1.0 and 2.0 $cm.^3$ per 100 square inches per mil thickness when similarly tested.

The polymers most suited for the present invention are prepared by polymerizing a major portion of an olefinically unsaturated nitrile, such as acrylonitrile, and a minor portion of an ester of an olefinically unsaturated carboxylic acid, such as ethyl acrylate, in the presence of a major proportion of a conjugated diene monomer, such as butadiene, and a minor proportion of olefinically unsaturated nitrile, such as acrylonitrile.

The conjugated diene monomers useful in the present invention include 1,3-butadiene, isoprene, chloroprene, bromoprene, cyanoprene, 2,3-dimethyl-1,3-butadiene, 2-ethyl-1,3-butadiene, 2,3-diethyl-1,3butadiene and the like and others The olefinically unsaturated nitriles useful in the present invention are the alpha, beta-olefinically unsaturated mononitriles having the structure

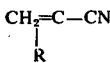

wherein R is hyodrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like.

The esters of olefinically unsaturated carboxylic acids useful in the present invention are preferably the lower alkyl esters of alpha,beta-olefinically unsaturated carboxylic acids and more preferred are the esters having the structure

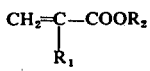

wherein $R_1$ is hydrogen, an alkyl group having from 1 to 4 carbon atoms, or a halogen and $R_2$ is an alkyl group having from 1 to 6 carbon atoms. Compounds of this type include methyl acrylate, ethyl acrylate, the propyl acrylates, the butyl acrylates, the pentyl acrylates, and the hexyl acrylates; methyl methacrylate, ethyl methacrylate, the propyl methacrylates, the butyl methacrylates, the pentyl methacrylates, and the hexyl methacrylates; methyl alpha-chloroacrylate, ethyl alpha-chloroacrylate and the like.

The more preferred polymers for the present invention are derived from (A) about 60 to 90 parts by weight of an alpha,beta-olefinically unsaturated mononitrile having the structure $CH_2=C(-R_1)-CN$ where $-R_1$ is selected from the group consisting of hydrogen, halogen, and the lower alkyl groups, (B) about 40 to 10 parts by weight of an ester of an olefinically unsaturated carboxylic acid having the structure $CH_2=C(-R_1)-C(O)O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 % by weight of moieties derived from a conjugated diene monomer and about 40 to 20 % by weight of moieties derived from a mononitrile having said $CH_2=C(-R_1)-CN$ structure.

The most preferred polymers for the present invention are derived from about 60 to 90 parts by weight of acrylonitrile or methacrylonitrile and about 40 to 10 parts by weight of an ester selected from the group consisting of methyl acrylate, ethyl acrylate and methyl methacrylate, polymerized in the presence of about 1 to 20 additional parts by weight of a nitrile rubber containing about 60 to 80 % by weight butadiene or isoprene moieties and about 40 to 20 % by weight of acrylonitrile or methacrylonitrile moieties.

More specifically, the most preferred polymers are derived from about 73 to 77 parts by weight acrylonitrile and 27 to 23 parts by weight methyl acrylate, polymerized in the presence of 8 to 10 additional parts by weight of a nitrile rubber containing about 70 % by weight butadiene moieties and about 30 % by weight acrylonitrile moieties.

Examples of the polymers best suited for use in the instant invention may be found in U.S. Pat. No. 3,426,102, the entirety of which is hereby incorporated into the instant specification by reference.

Forming the parison may be achieved by any one of several techniques. In one method, a hollow cylinder is extruded from an annular die. The bottom end of the parison is formed by closing one end of the cylinder by pinching, swaging, compression molding, or some other mechanical means either immediately after extrusion when the cylinder is still hot, or after the cylinder (or at least one end thereof) has been reheated. The other end of the cylinder is left open for subsequent blowing. The desired neck finish can be formed either by a mechanical forming of the open end of the cylinder (such as compression molding) or by blowing into a neck mold of the proper dimensions. The forming of the neck finish can be accomplished either immediately after extrusion when the cylinder is still hot or after the cylinder (or at least this end thereof) is reheated.

The continuous extruded cylinder can be cut to the proper length by a separate cutting operation or by mechanical means such as the pinching used to close the cylinder end, or by a combination of these methods. (See U.S. Pat. No. 3,599,280).

Extrusion blow molding is another parison forming technique that may be employed. In this method, the starting parison for the orientation blowing step is formed by blowing a hollow cylinder, extruded as described above, at a high temperature.

If it is found desirable in forming bottles of the desired material and orientation distribution to start with a parison of non-uniform thickness and/or diameter, as seen in FIG. 1, injection molding the parison is recommended, as well as any of several "programmed parison" methods when the parison is extruded, such as variable extrusion rates, a movable core mandrel, mechanical stretching of the cylinder as it is extruded, or mechanical stretching of a cylinder of non-uniform axial temperature distribution. Mechanical means such as compression molding, swaging or machining also enable one to begin bottle blowing with a non-uniformly thick parisons.

The next step in providing a plastic bottle according to the present invention comprises blow molding the parison in the leathery state into the desired bottle shape using high pressure fluid, at which time the polymer is oriented. Generally, the bottle is blown to a sidewall thickness between 5 and 50 mils at the maximum diameter, and preferably between 15 and 35 mils. Since resistance to creep is proportional to the amount of molecular orientation, it is desirable that the molecular orientation level be as high as possible, as determined by orientation release stress. The level of orientation achieved is dependent upon variations in conditions under which the bottle is oriented. Higher levels of orientation result from greater stretching rates, greater amounts of stretch, and/or lower stretching temperatures. It is thus desirable to blow slightly above the glass transition temperature. Once the bottle is blown, the orientation is locked in by cooling the bottle below the glass transition temperature. For the present invention, an average orientation release stress in the circumferential direction between 350 and 2500 p.s.i. as measured for total sidewall thickness may be imparted to the polymer comprising the bottle. Preferably the orientation release stress will fall between 500 and 1600 p.s.i., since within this range it is easy to avoid stress whitening of the polymer which so often accompanies higher levels of orientation, thus enabling the formation of a transparent bottle having high molecular orientation. Most preferably, the orientation release stress will fall between 800 and 1000 p.s.i.

For purposes of this specification, creep strain is defined to be the net total strain of the bottle when subjected to internal pressure creating a wall stress in the circumferential direction. For molecularly oriented bottles this strain is the resultant of a tendency for the bottle to expand under the effect of the internal pressure and an opposing tendency for the bottle to contract as a result of the locked-in orientation stresses. It can be shown that the net effect of these two tendencies could be substantially 0 % creep strain which might even be a small, negative, resultant amount of creep strain (contraction).

Unoriented bottles subjected to tensile forces (such as those resulting from internal pressure) respond with a rapid elastic extension followed by a viscous extension which takes place over a long period of time. The behavior of oriented bottles is more complex. They too exhibit elastic and viscous extensions in response to tensile forces; however, these extensions are opposed by the tendency to contract which is inherent in all molecularly oriented plastics. It is well known that oriented plastics shrink when heated above their glass transition temperature. Shrinkage also occurs below the glass transition temperature but at a greatly reduced rate. This shrinkage results from the molecules attempting to return to the random coil configuration from the extended network structure produced during the orientation process. The net amount of creep strain is therefore due to a balance which exists between these tensile and retractive tendencies. Where the retractive tendency is very strong and the tensile forces are moderate, there is the very real possibility of achieving 0 % strain or of having a net contraction (a negative extension).

Bottles made according to the instant invention exhibit a sidewall creep strains in the circumferential direction between 0 and 2.0 % when tested at a wall stress of 3000 p.s.i. in the circumferential direction after 100 hours at 98°F. at 50 % relative humidity. The wall stress, in test conditions, is generated by pressurized water. More specifically, under the same conditions, the bottles made according to the instant invention exhibit creep strains between 1.0 and 2.0 %. When tested at 4000 p.s.i., bottles of the present invention exhibit sidewall creep strains between 0.25 and 3.0 %.

Bottles of the present invention, i.e., weighing between 0.03 and 0.13 grams per cubic centimeter of internal volume, exhibit superior impact strength. They are able to withstand a free fall onto a steel surface when dropped on their bottoms of preferably at least about 6 and even as high as about 25 feet when enclosed and filled with water carbonated with 3.7 volumes of carbon dioxide per 1 volume of water. More specifically, they are able to withstand free falls between about 9 and 11 feet particularly when the bottles weigh between 0.06 and 0.1 grams per cubic centimeter of internal volume. Naturally, heavier bottles having thicker walls can be dropped from greater heights without breaking. For purposes of this specification and the claims that follow, the drop heights indicated would be those as determined by ASTM D-2463. The data set forth in Table II, although not tested as per ASTM D-2463, clearly supports the range set forth above.

Another method of determining impact properties, independent of bottle geometry, consists of measuring the amount of energy absorbed in a flexural test conducted at high rates of loading. Test specimens are pieces of plastic cut from the walls of the bottle, and the results are reported in inch-lbs./square inch. This test is similar in many respects to the well known Charpy Impact Test ASTM-D 256-56 (1961), Method B, Unnotched, the primary difference being a smaller test specimen. Test conditions are as follows:

SPECIMEN DIMENSIONS

Width — 0.125 inch
Thickness — 0.015–0.035 inch
Length — 0.5 inch
Distance between end supports — 0.160, 0.240 inch
Test speeds (in./sec.) — 2.5, 110, 260

Specimens tested according to the above conditions demonstrate flexural impact values in excess of 3000 inch-lbs./square inch in the circumferential direction.

Figure 2:
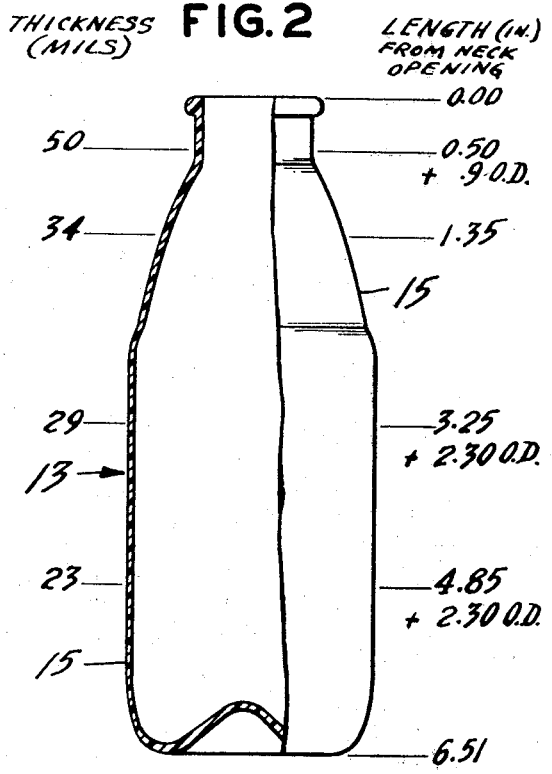
FIG. 2 is a central vertical sectional view of a bottle blow molded from the parison of FIG. 1.

In the examples that follow, the blown bottles all have the shape shown in FIG. 2, and the polymer used was derived from 75 parts by weight acrylonitrile and 25 parts by weight acrylate polymerized in the presence of 9 additional parts by weight of a nitrile rubber containing about 70 % by weight 1,3-butadiene and about 30 % by weight acrylonitrile. This polymer has a glass transition temperature of about 180°F. All bottles discussed in the examples below were blown to produce a transparent bottle.

Figure 3:
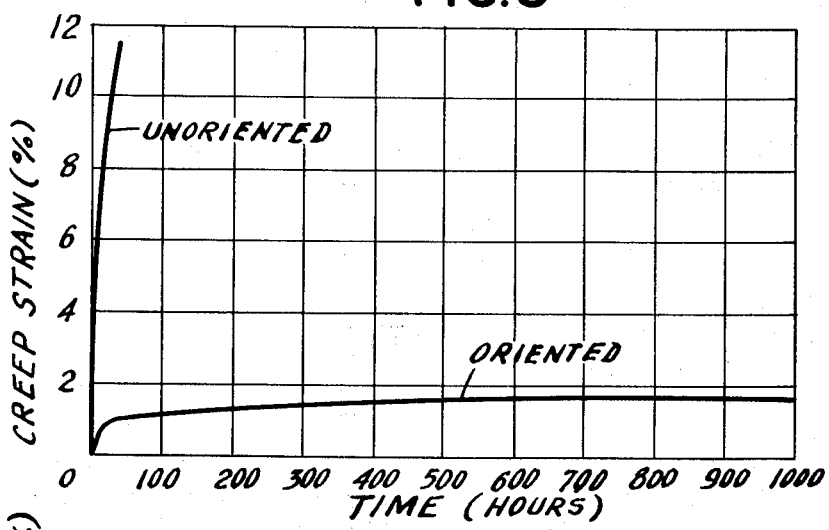
FIG. 3 is a graph of the creep strain in the sidewall of an oriented and unoriented bottle at 98°F. and 50 % relative humidity.

The difference in creep behavior between unoriented and oriented bottles is shown in FIG. 3. The unoriented bottle was made by extrusion blow molding. It has an internal volume of 12.4 fluid ounces, weighs 44 grams and has a wall thickness of 40 mils. The oriented bottle was blown from a 5½ inch long extrusion blow molded parison into a bottle 7 inches high having a wall thickness of 25 mils, weighing 26.8 grams, having a 2¼ inch diameter and an internal volume of 10.3 fluid ounces. The oriented bottle had an orientation release stress in the circumferential direction of 900 p.s.i. The two bottles exhibit completely different behavior patterns under the conditions of the creep strain test: 98°F., 50 % relative humidity and a 3000 p.s.i. wall stress. The oriented bottle has a total strain in the circumferential direction of 1.6 % after 1000 hours. By contrast, the unoriented bottle shows a creep strain of 9 % after only 20 hours at the same conditions.

Other tests indicate that resistance to creep strain improves as the amount of molecular orientation is increased. Unoriented bottles were made by conventional extrusion blow molding while the oriented bottles were made by blowing at low temperatures, between 190° and 218°F. The following results indicate the percent creep strain at 3300 p.s.i. at 100 hours at 98°F., at 50 % relative humidity in the circumferential direction:

| CIRCUMFERENTIAL ORIENTATION RELEASE STRESS (p.s.i.) | STRAIN (%) | |
| --- | --- | --- |
| 0 | 6.2 | (30 hours) |
| 540 | 3.6 | |
| 640 | 2.0 | |
| 850 | 1.7 | |

As seen above, unoriented bottles creep more in 30 hours than do any of the oriented bottles at 100 hours.

Figure 4:
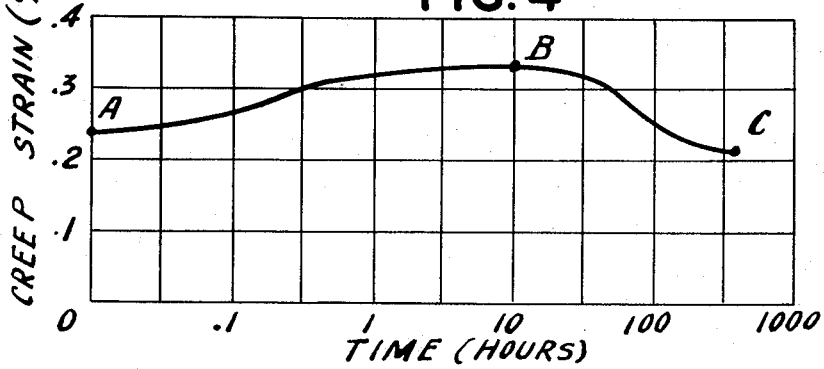
FIG. 4 is a graph showing three kinds of strain in an oriented bottle.

The graph shown in FIG. 4 illustrates how zero or negative creep strain can be attained. The bottle was blown from an extrusion blow molded parison 5½ inches long. The parison had a ¾ inch outer diameter with a 0.130 inch thick wall.

The parison was heated in a 550°F. oven for 49 seconds and cooled for 85 seconds prior to blowing. The bottle was blown at a maximum pressure of 150 p.s.i. with a 43 second blowing time. The bottle developed an orientation release stress of 800 p.s.i. in the circumferential direction. The bottle was tested for creep strain in the circumferential direction at 98°F. at 50 % relative humidity at a wall stress of 2000 p.s.i.

Elastic strain is the strain which occurs immediately on stressing the bottle. Because it is impossible to make accurate measurements of strain at extremely short periods of time, the elastic strain is defined as "the strain which occurs in the first 36 seconds of the test." This is the strain at Point A on the graph of FIG. 4. The strain at longer time periods represents a balance between viscous extension and "orientation contraction." During the time represented by the interval A–B viscous extension dominated and the specimen extended. During the time period B–C orientation contraction was the dominant effect and the sample contracted. If the specimen had been more highly oriented there would have been even more orientation contraction and the net strain could have been zero or even a negative percentage.

The following tables (I and II) describe bottles blown from extrusion blow molded parisons 5, 5½ and 6 inches long, having a ¾ inch outer diameter and a 0.130 inch thick wall. The closed end of the parisons were formed in the extrusion blow molding step. The parisons were heated in a radiant oven having a temperature of 550°F. After removal from the oven the parisons were conditioned for blowing by holding them in the air. Additional bottles were filled with carbonated water (3.7 ml. $CO_2$/ml. $H_2O$). These bottles were sealed and tested for impact resistance by dropping them on their bottoms onto a steel surface at 73°F. (Table II).

TABLE I

|  |  | 5" | 5½" | 6" |
|---|---|---|---|---|
| Time in oven (seconds) |  | 50–51 | 50 | 50 |
| Thermal conditioning (seconds) |  | 68 | 68–78 | 65–75 |
| Max. blowing pressure (p.s.i.) |  | 120 | 120 | 120 |
| Blowing time (seconds) |  | 27–32 | 27–30 | 20–35 |
| Bottle height (inches) |  | 7 | 7 | 7 |
| Bottle wall thickness (inches) |  | .023 | .025 | .027 |
| Bottle weight (grams) |  | 24.4 | 26.8 | 29.3 |
| Bottle diameter (inches) |  | 2¼ | 2¼ | 2¼ |
| Bottle internal volume (fl. oz.) |  | 10.3 | 10.3 | 10.3 |
| Orientation release stress, circumferential direction (p.s.i.) |  | 790 | 900 | 950 |
| % creep strain at 100 hours., 50% R. H. 98°F. |  |  |  |  |
| Wall stress (p.s.i.): | 3000 | .80 | 1.2 | 1.05 |
|  | 4000 | — | 2.0–2.1 | 2.6 |
|  | 5000 | 2.9 | 3.3 | 3.6 |
| % creep strain at 1000 hrs. 50% R. H. 98°F. |  |  |  |  |
| Wall stress (p.s.i.): | 3000 | 1.04 | 1.6 | 1.30 |
|  | 4000 | — | 2.6–2.8 | 4.1 |
|  | 5000 | 4.0 | 4.6 | 4.7 |

In Table II, B means the bottle broke, ad P (passed) means the bottle remained whole, and a dash means not tested. The failure of sample 4, 5½ inch length, appears to be anomalous in view of the remainder of Table II and other tests.

TABLE II

| PARISON LENGTH |  | DROP HEIGHT | | | |
|---|---|---|---|---|---|
|  |  | 5' | 10' | 15' | 20' |
| 5" | No. 1 | P | P | P | B |
|  | No. 2 | P | P | P | P |
| 5½" | No. 1 | P | P | P | B |
|  | No. 2 | P | P | — | — |
|  | No. 3 | — | P | P | B |
|  | No. 4 | B | — | — | — |
|  | No. 5 | — | — | P | — |
| 6" | No. 1 | P | P | P | P |
|  | No. 2 | — | P | — | — |
|  | No. 3 | P | P | B | — |

In yet another test, an injection molded parison was blow molded to develop an orientation release stress in the circumferential direction of 1520 p.s.i. This bottle had a transparent appearance, as did all other bottles discussed above.

Other specific polymers which are considered to be particularly advantageous for use in the instant invention are given below:

| COMPONENT (proportions by wt.) | A | B | C | D | E | F |
|---|---|---|---|---|---|---|
| acrylonitrile (parts) | 70 | 70 | 70 | 70 | 70 | — |
| methacrylonitrile (parts) | — | — | — | — | — | 75 |
| ethyl acrylate (parts) | 30 | 30 | 30 | 30 | — | — |
| methyl acrylate (parts) | — | — | — | — | 30 | — |
| methyl methacrylate (parts) | — | — | — | — | — | 25 |
| nitrile rubber (parts) | 10 | 15 | 10.7 | 10 | 9 | 10 |
| 1,3-butadiene (%) | 60 | 60 | 60 | 75 | 75 | 70 |
| acrylonitrile (%) | 40 | 40 | 40 | 25 | 25 | 30 |

A parison comprising 88 parts by weight methacrylonitrile and 12 parts by weight styrene was fabricated by injection molding. The parison was heated by placing it on a heated core pin, 265°F., and inserting the pin in an air oven, 250°F., for 4½ minutes. The parison was blown at a maximum pressure of 70 p.s.i. in about 20 seconds. The blown bottle developed an orientation release stress of 540 p.s.i. in the circumferential direction.

It is believed that acrolein and vinylidene chloride also function in the acrylonitrile copolymers. It is also believed that acrolein and alpha-methyl styrene function with methacrylonitrile copolymers. Terpolymers that are believed to function reasonably well include: acrylonitrile, methacrylonitrile and styrene; and acrylonitrile, methacrylonitrile and alpha-methyl styrene.

The instant invention applies to jars as well as bottles. It is also envisioned that the present invention could be made to function with other polymers such as acrylic multipolymers, copolymers of methacrylonitrile and polystyrene, saran and polyvinylchloride.

It is thought that the invention and many of its attendant advantages will be understood from the foregoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

What is claimed is:

1. A method for improving the resistance to creep strain in a container made from a thermoplastic polymeric material comprising a polymer containing moieties derived from a conjugated diene monomer and a polymer containing moieties derived from an alpha, beta-olefinically unsaturated mononitrile having the structure

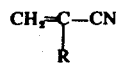

where R is selected from the group consisting of hydrogen, an alkyl group having from 1 to 4 carbon atoms, and a halogen, said method comprising the steps of forming a parison from said thermoplastic polymeric material, temperature conditioning the parison to bring the thermoplastic polymeric material to within the orientation temperature range wherein the polymeric material is in a leathery state, blow molding the temperature conditioned parison in a mold cavity to form the parison into the desired container shape and to stretch the polymeric material to molecularly orient at least the sidewall of the container to an orientation release stress between 500 and 2500 p.s.i., and removing the oriented container from the mold cavity.

2. The method of claim 1 wherein the thermoplastic polymeric material is derived from (A) about 60 to 90 parts by weight of an alpha, beta-olefinically unsaturated mononitrile having the structure $CH_2=C(-R_1)-CN$ where $-R_1$ is selected from the group consisting of hydrogen, halogen, and lower alkyl groups, (B) about 40 to 10 parts by weight of an ester of an olefinically unsaturated carboxylic acid having the structure $CH_2=C(-R_1)-C(O)O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 % by weight of moieties derived from a conjugated diene monomer and about 40 to 20 % by weight of moieties derived from a mononitrile having said $CH_2=C(-R_1)-CN$ structure.

3. The method of claim 2 wherein the orientation release stress is between 500 and 1600 p.s.i.

4. The method of claim 3 wherein the mononitrile is acrylonitrile or methacrylonitrile, the ester is selected from the group consisting of methyl acrylate, ethyl acrylate and methyl methacrylate, and the conjugated diene monomer is butadiene or isoprene.

5. The method of claim 4 wherein the orientation release stress is between 800 and 1000 p.s.i.

6. The method of claim 5 wherein the polymer is derived from 73 to 77 parts by weight acrylonitrile and 27 to 23 parts by weight of methyl acrylate, polymerized in the presence of 8 to 10 additional parts by weight of a nitrile rubber containing about 70 % by weight butadiene moieties and about 30 % by weight acrylonitrile moieties.

* * * * *